US005247462A

United States Patent [19]

Blasius et al.

[11] Patent Number: 5,247,462

[45] Date of Patent: Sep. 21, 1993

[54] METHOD OF DETECTING REGISTER ERRORS

[75] Inventors: Udo Blasius, Leimen; Manfred Korinek, Sinsheim; Jürgen Reithofer, Nussloch, all of Fed. Rep. of Germany

[73] Assignee: Heidelberger Druckmaschinen AG, Heidelberg, Fed. Rep. of Germany

[21] Appl. No.: 697,181

[22] Filed: May 8, 1991

[30] Foreign Application Priority Data

May 8, 1990 [DE] Fed. Rep. of Germany ....... 4014708

[51] Int. Cl.[5] ....................... G06F 15/46; B65H 23/00

[52] U.S. Cl. .................................... 364/559; 364/471; 356/401

[58] Field of Search ............... 364/559, 561, 562, 563, 364/471, 525, 526, 469; 226/2, 3; 356/401, 400

[56] References Cited

U.S. PATENT DOCUMENTS

| | | | |
|---|---|---|---|
| 4,264,957 | 4/1981 | Pautzke | 364/469 |
| 4,888,717 | 12/1989 | Ditto et al. | 364/559 |
| 5,016,182 | 5/1991 | Bergland et al. | 364/469 |
| 5,076,163 | 12/1991 | Sainio | 101/181 |

*Primary Examiner*—Thomas G. Black
*Assistant Examiner*—Michael Zanelli
*Attorney, Agent, or Firm*—Herbert L. Lerner; Laurence A. Greenberg

[57] ABSTRACT

A method of detecting register errors on a printed product includes providing the printed product with register marks respectively having two edges extending with opposite angles obliquely to a web travel direction, passing the printed product through a printing machine, and scanning the register marks opto-electrically with sensors which may have at least four sensor elements arranged substantially in a square.

8 Claims, 7 Drawing Sheets

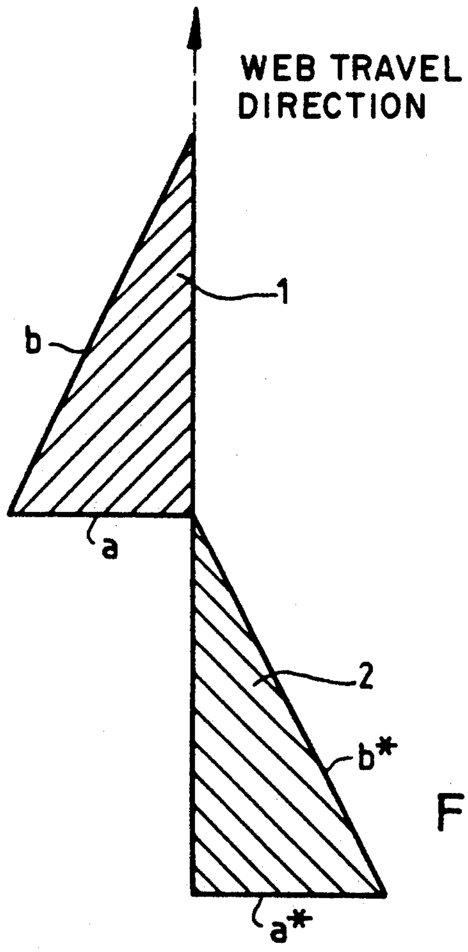
Fig.1
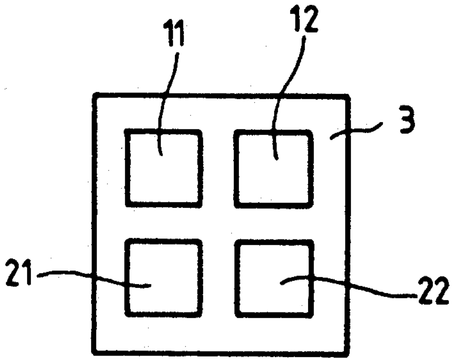
Fig.2
Fig.3A
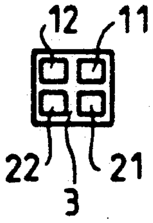
Fig.3B
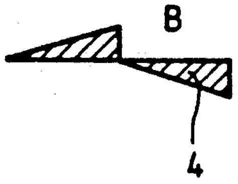
Fig.3C
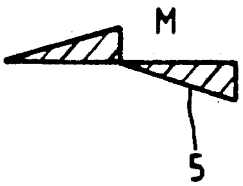
Fig.3D
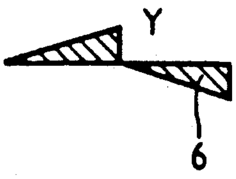

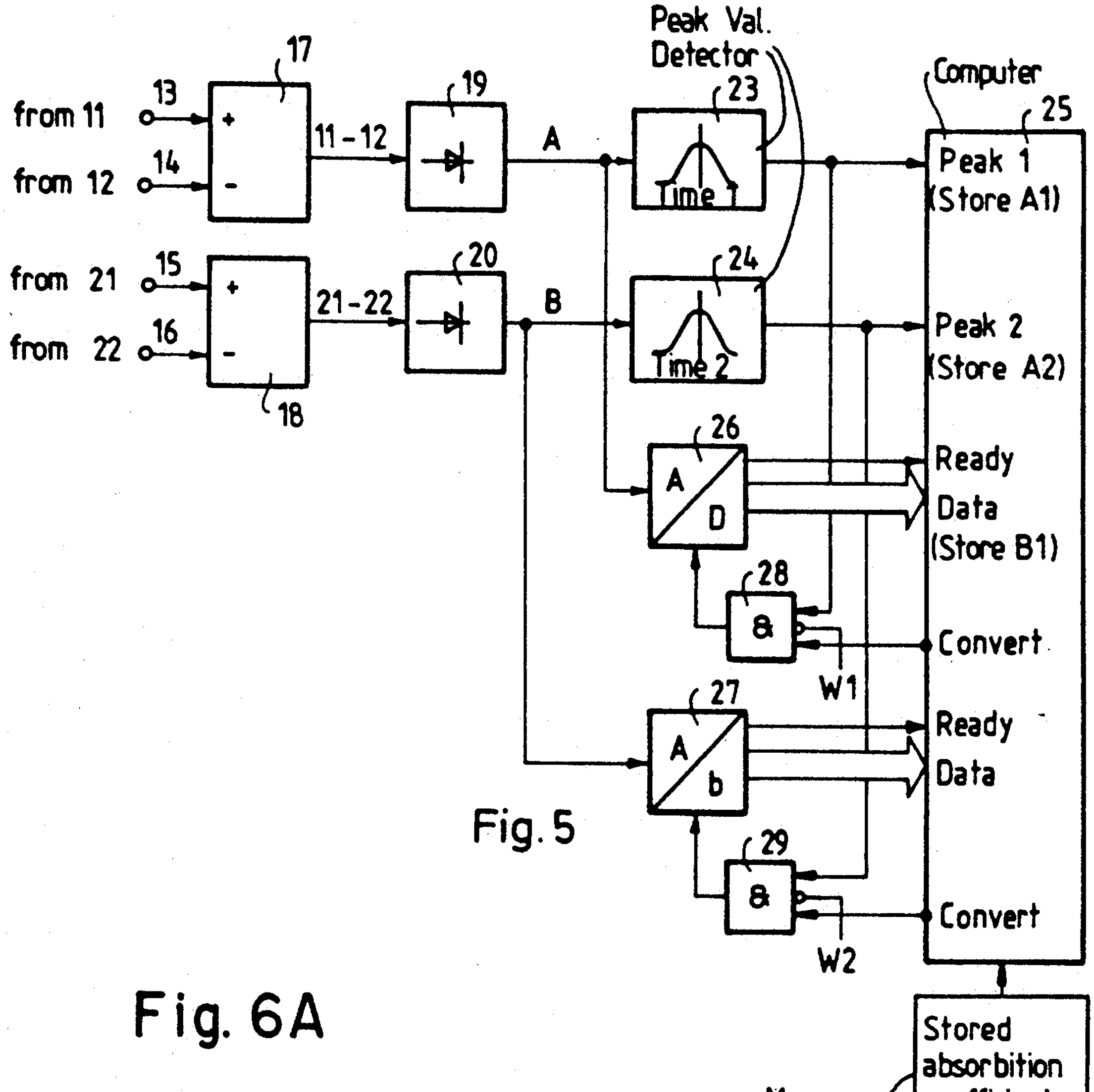
Fig. 5
Fig. 6A
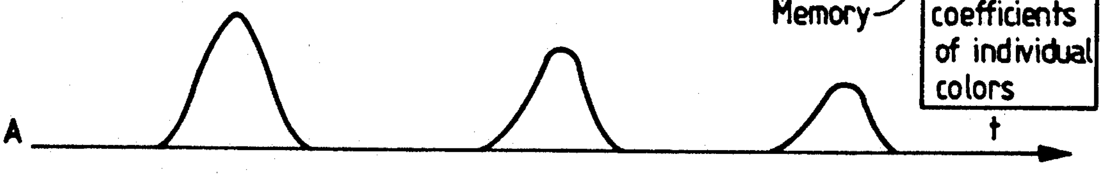
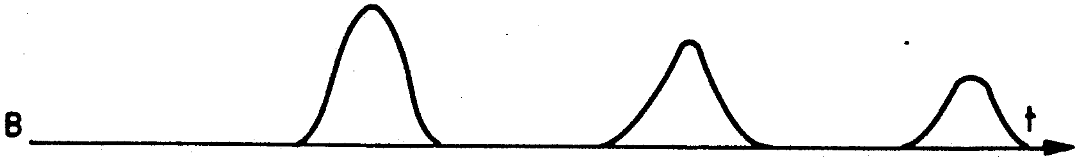
Fig. 6B

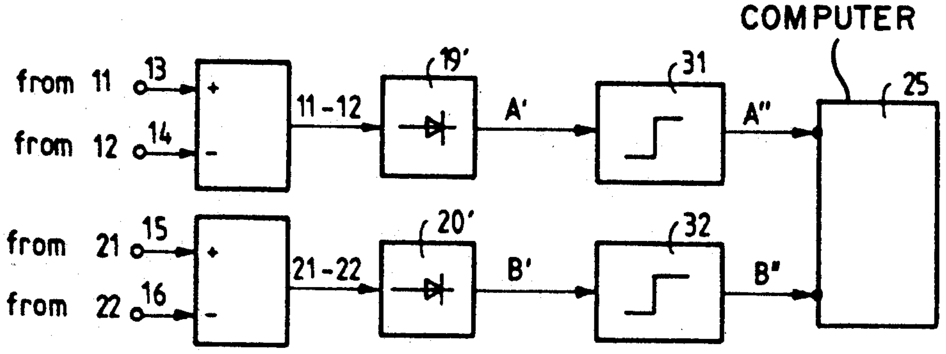
Fig. 7
Fig. 8A
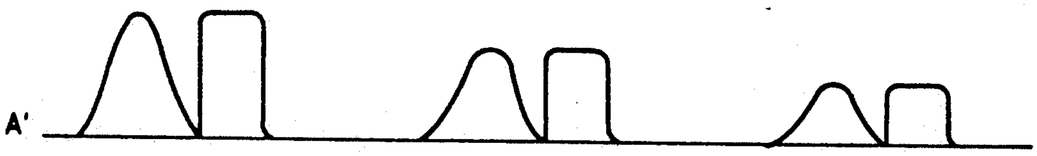
Fig. 8B
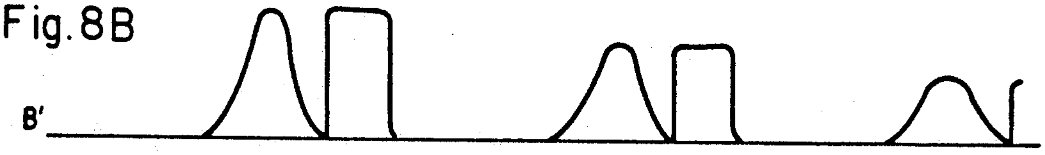
Fig. 8C
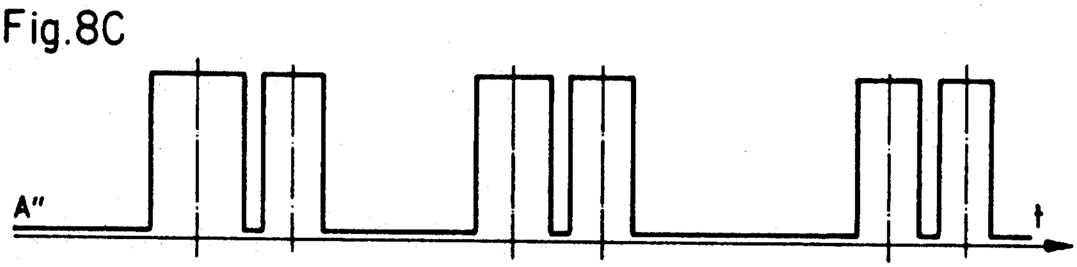
Fig. 8D
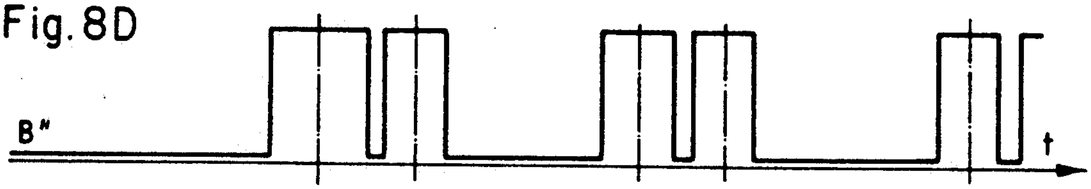

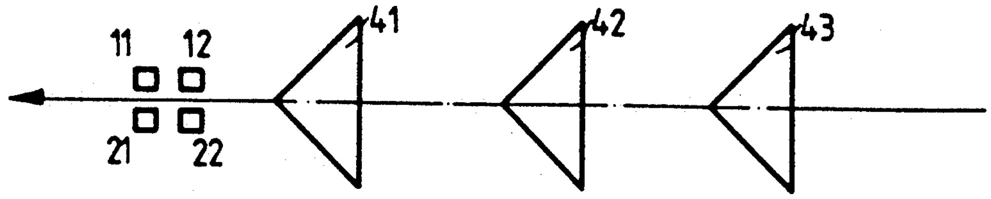
Fig. 9
Fig. 10A
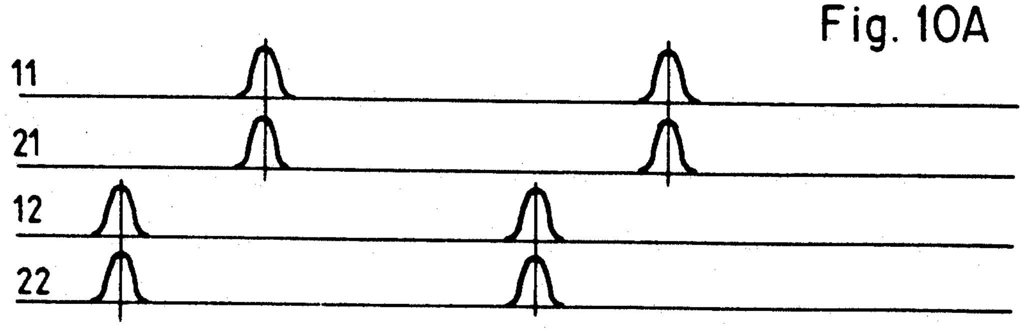
Fig. 10B
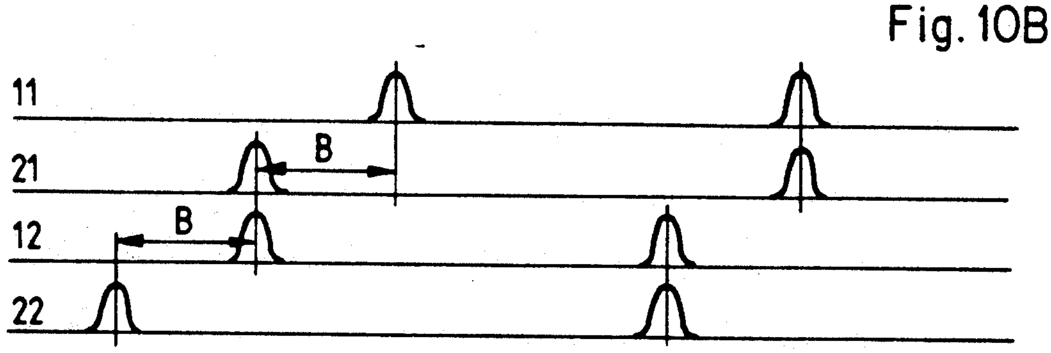
Fig. 10C
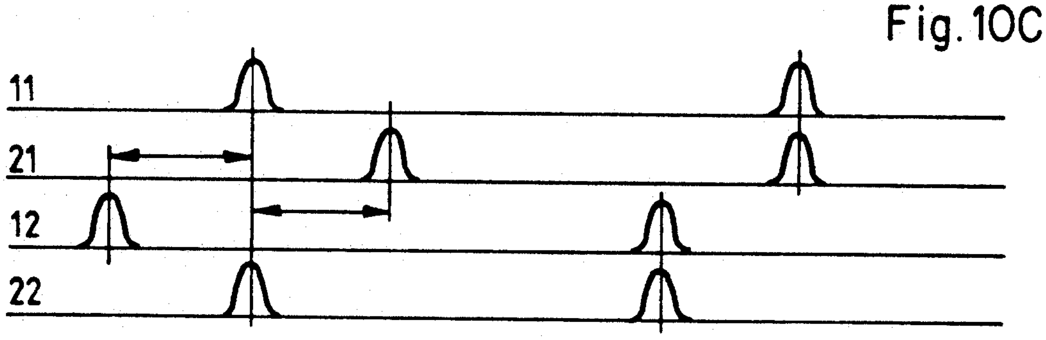
Fig. 10D
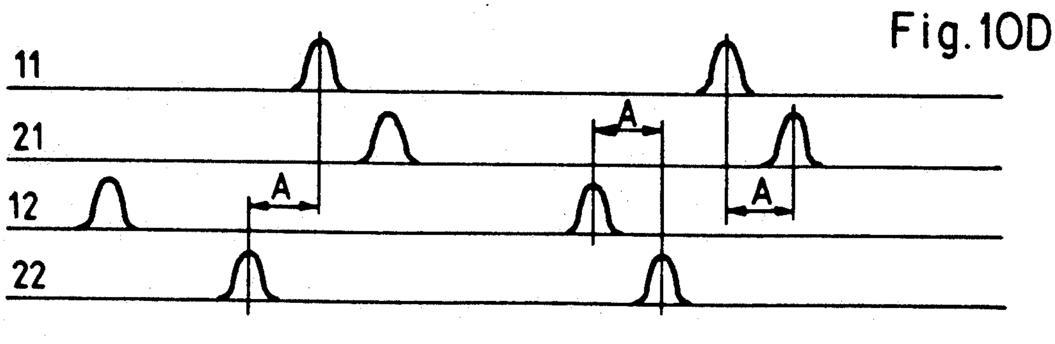

METHOD OF DETECTING REGISTER ERRORS

The invention relates to a method of detecting register errors and, more particularly, wherein register marks, are provided on a printed product which is passed through a printing machine and opto-electrically scanned.

In the detection of register errors, register marks have heretofore become known which have edges extending obliquely in addition to edges extending transversely to a web travel direction. When these register marks are scanned with opto-electrical sensors, a measure for register errors in the web travel direction can be obtained from the edges which extend transversely to the web travel direction. The instant of time at which the obliquely extending edges are scanned is dependent upon register errors in the web travel direction and upon register errors oriented perpendicularly to the web travel direction.

In a heretofore known control arrangement for longitudinal-axis and lateral paper web alignment (German Published Non-Prosecuted Application (DE-OS) 21 51 264), a register error measured at an oblique edge perpendicularly to web travel direction (lateral register error) is corrected by evaluating the register error in the web travel direction.

It is accordingly an object of the invention to provide an improved method of detecting register errors, especially lateral register errors.

Another object of the invention is to provide such a method wherein the analysis or evaluating of the sensor signals is achieved with minimum technical outlay and with which lateral register errors can be accurately detected and, in addition, diagonal or oblique register errors can only be detected.

With the foregoing and other objects in view there is provided, in accordance with the invention, a method of detecting register errors on a printed product which comprises providing the printed product with register marks respectively having two edges extending with opposite angles obliquely to a web travel direction; passing the printed product through a printing machine, and scanning the register marks opto-electrically with sensors which may have at least four sensor elements arranged substantially in a square.

In accordance with another mode of the invention, the method includes offsetting the edges with respect to one another in the web travel direction. This ensures that the register marks can be selected from the rest of the printed image with the aid of a computer. Moreover, the deviation of fold edges from the nominal position thereof can also be measured by means of the mark axis, if, as is usually the case, the marks are printed into the fold.

In accordance with a further mode of the invention, the method includes forming the register marks with further edges extending perpendicularly to the web travel direction. It is thus possible to obtain information on the register errors in the web travel direction (also known as circumferential register errors), independently of the other register errors.

In accordance with an additional mode of the invention, the method includes forming the respective register marks of two right triangles arranged on both side of a straight line extending in the web travel direction, the triangles being offset from one another in the web travel direction so that a respective cathetus of the triangles lies on the straight line.

In accordance with yet another mode of the invention, the method includes deriving pulse-like signals respectively identifying an instant of time at which an edge of the register mark is scanned.

In accordance with yet a further mode of the invention, the method includes subtracting the signals generated from two scanning elements lying one behind the other in the direction of web travel for forming the pulse-like signals.

In accordance with yet an added mode of the invention, the method includes comparing the pulse-like signals for detecting a register error transversely to the web travel direction with signals of two adjacent sensor elements arranged transversely to the web travel direction.

In accordance with yet an additional mode of the invention, the method includes for the purpose of detecting a register error in the web travel direction, comparing the pulse-like signals obtained by scanning a register mark edge extending transversely to the web travel direction with corresponding pulse-like signals of a further register mark.

In accordance with a concomitant mode of the invention, the method includes, for the purpose of detecting register errors in an oblique direction, comparing the pulse-like signals obtained when an edge extending perpendicularly to the web travel direction is scanned by two sensor elements disposed adjacent one another perpendicularly to the web travel direction.

Other features which are considered as characteristic for the invention are set forth in the appended claims.

Although the invention is illustrated and described herein as embodied in a method of detecting register errors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which:

FIG. 1 is a magnified view of a register mark;

FIG. 2 is an enlarged diagrammatic plan view of a sensor with four sensor elements;

FIGS. 3A–3D are views closer to actual scale of register marks marked for different colors which are scanned by the sensor of FIG. 2;

FIG. 5 is a block diagram of a system for performing one mode of the method according to the invention;

FIGS. 6A and 6B are plot diagrams of signals produced with the mode of the method according to the system of FIG. 5;

FIG. 7 is a block diagram of another system for performing another mode of the method according to the invention;

FIGS. 8A to 8D are plot diagrams of signals produced with the mode of the method according to the system of FIG. 7;

FIG. 9 is a view having a scale similar to that of FIG. 3 of a sensor and different register marks;

FIGS. 10A to 10D is a grouping of time-dependency diagrams of signals produced during the scanning of the register marks shown in FIG. 9;

Like parts are identified by the same reference characters in the figures of the drawing.

Figure 4A:
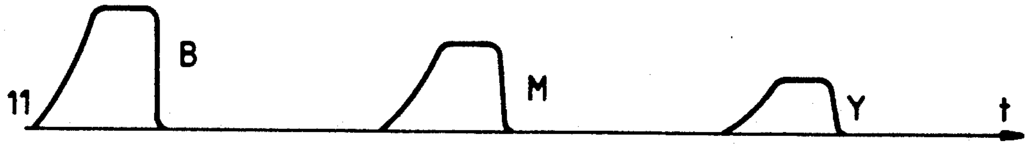
FIGS. 4A to 4F are plot diagrams of output signals of the sensor of FIG. 2 and differentiated signals formed from respective pairs thereof.
Figure 4B:
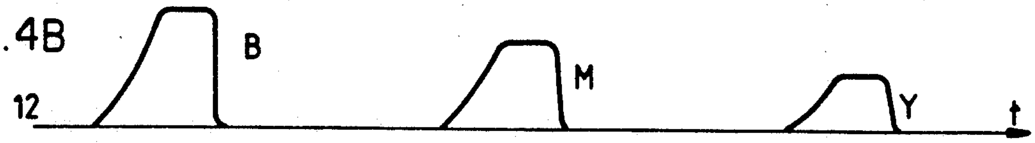
Figure 4C:
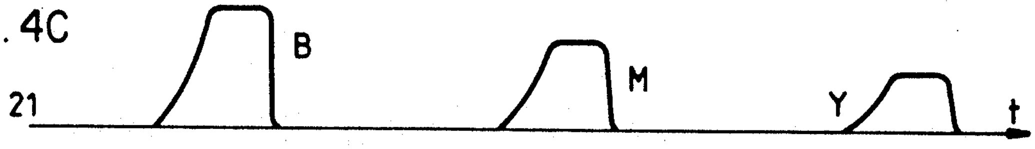
Figure 4D:
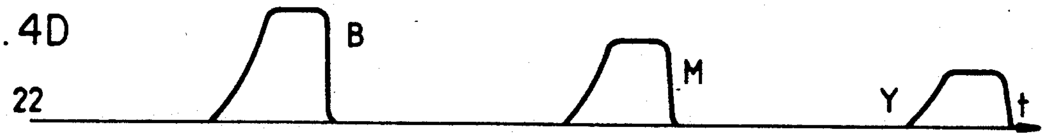
Figure 4E:
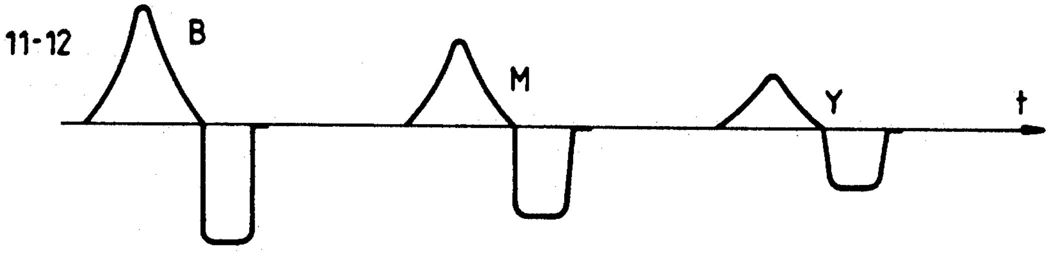
Figure 4F:
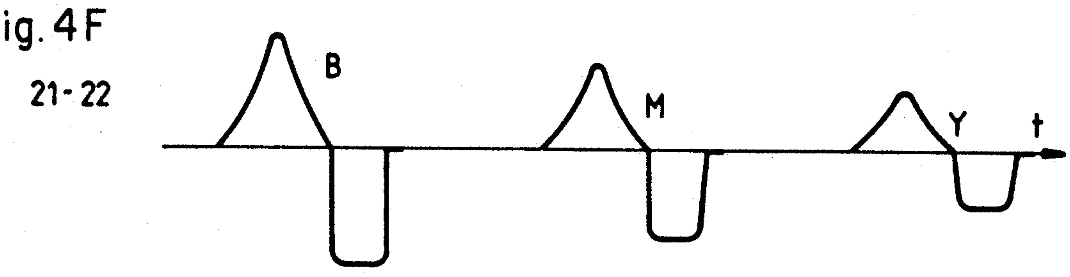

Referring further to the drawing and, first, particularly to FIG. 1 thereof, there is shown therein an advantageous register mark formed of two right triangles 1 and 2 which is so imprinted on a print sheet or signature that it moves in a direction of web travel indicated by an arrow. The register mark preferably has dimensions corresponding to those of conventional register marks and is very small compared to the size of the printed sheet. It thus takes up little space on the print sheet or signature and is not visible, for example, on a folded signature when it is disposed on a fold line thereof. The inclined or oblique edges b and b* permit the detection of a deviation in the time-dependent position of the signature, in a relatively simple manner, by scanning with the aid of a respective sensor. With the edges a and a*, a deviation in the position of the signature in the travel direction of the web can be detected by means of the same sensors.

FIG. 2 shows an arrangement of four sensor elements 11, 12, 21 and 22 in the form of a square. An arrangement of this kind is available on the market, for example from the Siemens Corporation—with the model designation SFH 204.

FIGS. 3A-3D illustrate the sensor 3, previously mentioned in connection with FIG. 2, as well as three register marks 4, 5 and 6 marked for different colors, for example, black (B), magenta (M) and yellow (Y), which are respectively imprinted, by a printing unit of a printing machine, on a web traveling in a direction towards the sensor 3. In order to be capable of measuring the position of the register marks with respect to one another, and therefore the register of the printed image, electrical signals are required which precisely conform with the respective positions of the register marks 4, 5 and 6. The signals emitted by the sensor 3, however, have edges or sides with a slope which depends upon the contrast of the respective color with paper white. In addition, due to the wedge shape, the upwardly sloping edge or side of the signals is flatter than the downwardly sloping edge or side thereof.

The output signals of the sensor elements 11, 12, 21 and 22 produced during the scanning of the register marks 4, 5 and 6 are represented in FIGS. 4A to 4F by means of time dependent or time diagrams wherein the individual horizontal lines respectively correspond to the specific sensor element designated and the individual pulses respectively correspond to the register mark colors designated, namely, B for black, M for magenta and Y for yellow. If the represented signals were converted into binary signals with the aid of a threshold-value comparator without any further measures, the leading sides thereof would be dependent upon the respective slope of the leading sides of the signals and thus upon the respective color.

This dependence is avoided by means of the circuit arrangement shown in FIG. 5. The output signals of the sensor elements 11, 12, 21 and 22 are fed to the inputs 13, 14, 15 and 16, respectively, after appropriate amplification, if necessary or desirable. The output signals of respective pairs of the sensor elements, which lie one behind the other in the direction of web travel, are subtracted in respective subtraction circuits 17 and 18. The signals 11–12 and 21–22 resulting therefrom are also represented in FIG. 4.

With the aid of the succeeding rectifiers 19 and 20 (FIG. 5), the negatively directed portions resulting from the subtraction are cut out, so that the signals A and B represented in FIGS. 6A and 6B are formed. These signals are transmitted to respective peak value detectors 23 and 24 which deliver a pulse PEAK1 and PEAK2, respectively, to a computer 25 at the instant of time the maximum value of the respective signals A and B is reached.

Independently of the color, the pulses PEAK1 and PEAK2 represent the instant of time at which the respective register mark occupies a predetermined position. These various instants of time are compared with one another or with a nominal value, respectively, in a computer 25, so that register is optimized through appropriate control of the printing machine.

In addition to being able to effect the color-independent determination of the position of the register marks, it is possible, with the circuit arrangement represented in FIG. 5, to determine the color of a respective register mark which has been scanned. For this purpose, the signals A and B are fed to a respective analog-digital converter 26 or 27. In order to convert the respective peak value into a digital signal, the analog-digital converters 26 and 27 are triggered with PEAK1 and PEAK2, respectively. For this purpose, a respective AND circuit 28, 29 is provided, to which the respective pulse PEAK1, PEAK2 is fed, on the one hand, and a CONVERT signal from the computer 25, on the other hand. This CONVERT signal defines a period of time in which the peak value can lie. Through this method, the conversion of peak values of other signals can be excluded.

The output signals of the analog-digital converters 26 and 27 are fed to corresponding inputs of the computer 25 and are compared thereat with stored values of the absorption coefficients of the individual colors. The result of this comparison provides information on the color of the respective register mark which has been scanned. This information can be used, for example, to feed the control signals, respectively, generated by the computer 25 to the appropriate printing unit.

In fact, for position control in the travel direction of the web, two sensor elements 11, 12 and 21, 22, respectively, are sufficient. In addition, the use of four sensor elements, with respectively two sensor elements thereof scanning one of the parts of the register marks 4, 5 and 6 (FIG. 1), permits control of the position transversely to the web and, if necessary or desirable, control in a diagonal or oblique direction, through appropriate analysis or evaluation in the computer 25.

The circuit arrangement according to FIG. 7 permits evaluation only of the position of the register marks; a recognition or determination of the color thereof, however, is not possible. The expenditure or outlay for analog circuits employed is correspondingly smaller in comparison with that for the circuit arrangement according to FIG. 5. In the embodiment of the invention according to FIG. 7, the rectifiers 19′ and 20′ are full-wave rectifiers, i.e., the negative portions of the output voltages of the subtraction circuits 17 and 18 are not suppressed, but rather, inverted. The signal A′ and B′ then have the shape shown in FIGS. 8A to 8D. By means of threshold comparators 31 and 32, binary signals A″ and B″ are formed from the signals A′ and B′. The signals A″ and B″ are fed to inputs of the computer 25, whereat the pulse center corresponding in time to the amplitude maximum (peak value) of the analog signal is then calculated. Through the use of this pulse center as a measure for the position of the register marks, no errors occur as a result of different rise or slope speeds of the pulse.

By means of FIGS. 9 and 10A to 10D, an embodiment of the invention for analyzing the signals fed to the computer 25 (FIGS. 5 and 7) is explained hereinbelow. Triangular register marks 41, 42 and 43 are provided in the interest of clarity. The signals obtained by scanning the register marks 4, 5 and 6 (FIG. 3) are analyzed or evaluated in a manner which appropriately takes into account the displacement of both halves of these register marks.

The register marks 41, 42 and 43 are respectively printed on the web, by one printing unit and in one color so that, for correct register, the marks are disposed on a dot-dash line, as shown in FIG. 9, with a defined mutual spacing S.

For different register errors, the time-dependent position of the pulse-like signals resulting from scanning the edges of the register marks 41 to 43 is represented in FIG. 10. The individual lines in FIGS. 10A to 10D, are identified in a manner corresponding to the reference numerals identifying the sensor elements 11, 21, 12 and 22.

FIG. 10A shows the time-dependent position of the pulse when no register errors are present. The diagrams according to FIG. 10B show a lateral register error, the scanned register mark in the view according to FIG. 9 lying too low. With respect to the pulses generated by the sensor elements 21 and 22, the pulses generated by the sensor elements 11 and 12 demonstrate a time-lag B. This lag B represents a measure of the size of the lateral register error.

FIG. 10C represents the conditions prevailing in the case of a lateral register error in the opposite direction, i.e., the register mark in the view of FIG. 9 is displaced upwardly.

FIG. 10D shows the pulses in the case of a lateral downward register error and a diagonal or oblique register error A. The register errors in the circumferential direction are detected due to the time intervals between the scanning of the individual register marks. This is not apparent in FIG. 10, because only the pulses resulting from the scanning of one register mark are represented in FIG. 10.

The time lags A and B, as well as the unidentified time lags between two different register marks are entered into the computer 25 in a conventional manner with the aid of counters which are incremented with a frequency which is considerably higher than the repetition frequency of the pulses.

Figure 11:
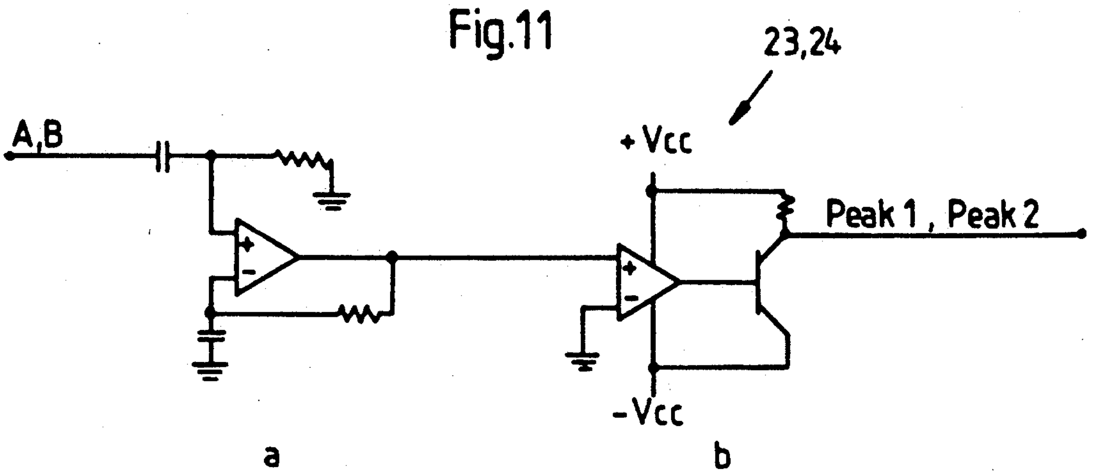
FIG. 11 is a circuit diagram of a peak detector.
Figure 12A:
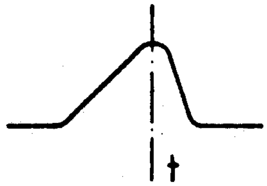
FIGS. 12A to 12C are a set of waveforms seen before, during, and after a peak detection process.
Figure 12B:
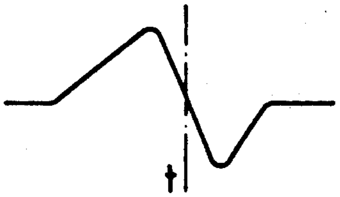
Figure 12C:
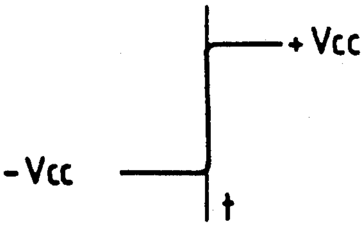

The construction of the peak value detectors 23 and 24 diagrammatically represented in FIG. 5 is shown in FIG. 11, wherein a differentiation stage a differentiates the input signal, seen in FIG. 12A, as it is generated by the rectifier stages 19 and 20. The differentiated signal is shown in FIG. 12B crossing the zero axis at time t, at the peak of the signal. A zero-crossing detector stage b, following the differentiation stage a in FIG. 11, generates at its output a logic high (i.e., a "1") as shown in FIG. 12C exactly at the time t of the zero crossing.

As shown in FIG. 5, the logic high is fed to the computer inputs PEAK1 and PEAK2 to inform the computer 25 of the exact time at which the peak values occur, and to an input of AND-gates 28 and 29, which also have a second input connected to respective outputs "convert 1", "convert 2", of the computer 25. The output of the AND-gates 28 and 29 are connected to respective analog-to-digital converters 26 and 27. When the computer 25 is ready to receive the digitized peak value of the signal, the respective computer output "convert 1", "convert 2" goes high, and when the signal actually reaches its peak value at time t, as determined by the peak detectors 23 and 24, the output of the AND-gates 28 and 29 operates to activate the respective A/D converter 26, 27 to convert the peak value of the rectifier outputs A and B to digital format which is received by the computer 25 at inputs "Data 1" and "Data 2", respectively. The actual peak value with the respective time of appearance thereof are processed in the computer 25 to determine the color which, in turn identifies the particular color printing unit, the circumferential register and the lateral register of the print.

Figure 13:
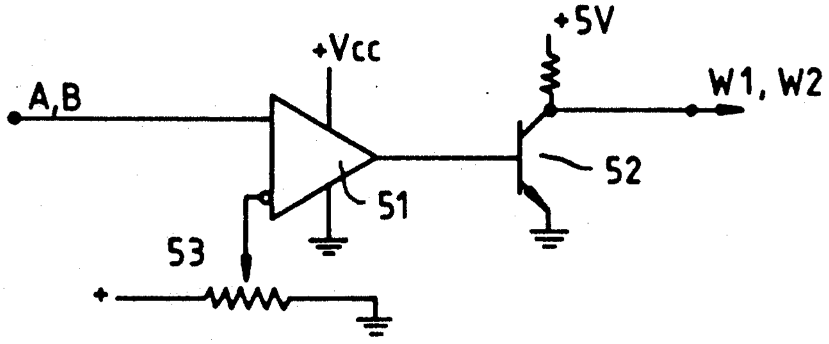
FIG. 13 is a circuit for converting an analog signal to digital format.

The AND-gates may advantageously have a third input designated W1 and W2, respectively. These inputs define the general time at which the output signal from the rectifiers 19 and 20 is present, in order to differentiate other signals, as may be caused when the actual printed image passes under the sensors 3, which causes the sensors to generate an unwanted noise signal. For that purpose, the output signal from the rectifiers 19 and 20 is converted to a logic signal in a circuit, as shown in FIG. 13, which has an analog input A, B connected to the outputs A, B of the respective rectifiers 19 and 20. The signal is converted in an amplifier stage 51 and a transistor 52 into a logical level signal, compatible with the inverted inputs W1, W2 of the AND-gates 28 and 29. A potentiometer 53 operates to bias the amplifier 51 so that only the general peak region of the signal is selected, and not the noise generated by the image information.

It should be noted that the circuits shown in FIGS. 11 and 13 are conventional and are only to be considered as examples of circuits of this type.

Figure 14:
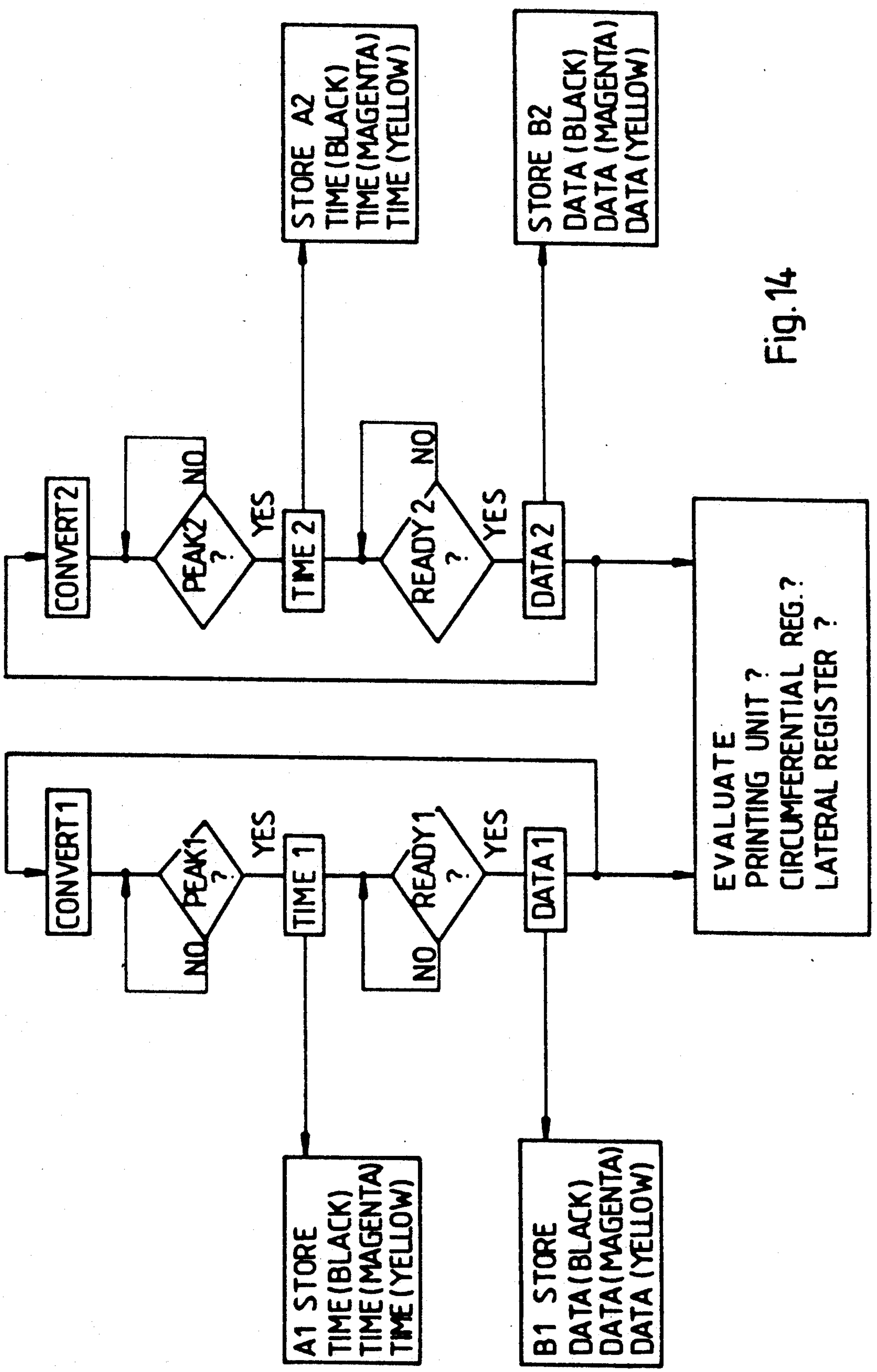
FIG. 14 is a flow chart showing the steps of determining the identity of the printing unit, the circumferential register, and the lateral register.

FIG. 14 is a self-explanatory flow-chart showing the method steps performed in the afore-described system in order to provide the data required for the computer 25 to compute the identity of the printing unit, the circumferential register and the side (i.e. "lateral") register of the respective printing unit.

We claim:

1. In a method of detecting register errors on a printed product, the improvement comprising the steps of providing the printed product with register marks respectively having two edges extending with opposite angles obliquely to a web travel direction, passing the printed product through a printing machine, scanning the register marks opto-electrically with sensors having at least four sensor elements arranged substantially in a square.

2. In a method of detecting register errors on a printed product, the improvement comprising the steps of providing the printed product with register marks respectively having two edges extending with opposite angles obliquely to a web travel direction, passing the printed product through a printing machine, scanning the register marks opto-electrically with a plurality of pulse-generating sensors, forming differential signals from the pulses of at least two of the sensors, rectifying the signals, determining peak values of the signals as representative of instants of time at which respective register marks occupy a predetermined position, digitalizing the peak values of the signals, and feeding the peak and digitalized values to a computer for detecting register errors.

3. Method according to claim 2, which includes forming the respective register marks of two right triangles arranged on both sides of a straight line extending in the web travel direction, the triangles being offset from one another in the web travel direction so that a respective cathetus of the triangles lies on the straight line.

4. Method according to claim 2, wherein the pulse-like signals respectively identify an instant of time at which at least one of said two edges of the register mark is scanned.

5. In a method of detecting register errors on a printed product, the improvement comprising the steps of providing the printed product with register marks respectively having two edges extending with opposite angles obliquely to a web travel direction, passing the printed product through a printing machine, scanning the register marks opto-electrically with a plurality of pulse-generating sensors, forming signals from the pulses generated by at least two of the sensors lying one behind the other in the direction of web travel, and subtracting the signals generated from the two sensors for deriving pulse-like signals respectively identifying an instant of time at which at least one of said two edges of the register mark is scanned.

6. In a method of detecting register errors on a printed product, the improvement comprising the steps of providing the printed product with register marks respectively having two edges extending with opposite angles obliquely to a web travel direction, passing the printed product through a printing machine, scanning the register marks opto-electrically with a plurality of pulse-generating sensors, deriving pulse-like signals respectively identifying an instant of time at which at least one of said two edges of the register mark is scanned by two of the sensors lying one behind the other in the direction of web travel, and comparing the pulse-like signals for detecting a register error transversely to the web travel direction with signals of two adjacent sensor elements arranged transversely to the web travel direction.

7. In a method of detecting register errors on a printed product, the improvement comprising the steps of providing the printed product with register marks respectively having two edges extending with opposite angles obliquely to a web travel direction, passing the printed product through a printing machine, scanning the register marks opto-electrically with a plurality of pulse-generating sensors, deriving pulse-like signals respectively identifying an instant of time at which at least one of said two edges of the register mark is scanned from two of the sensors lying one behind the other in the direction of web travel, and, for the purpose of detecting a register error in the web travel direction, comparing the pulse-like signals obtained by scanning a register mark edge extending transversely to the web travel direction with corresponding pulse-like signals of a further register mark.

8. In a method of detecting register errors on a printed product, the improvement comprising the steps of providing the printed product with register marks respectively having two edges extending with opposite angles obliquely to a web travel direction, passing the printed product through a printing machine, scanning the register marks opto-electrically with a plurality of pulse-generating sensors, deriving pulse-like signals respectively identifying an instant of time at which an edge of the register mark is scanned by two of the sensors lying one behind the other in the direction of web travel, and, for the purpose of detecting register errors in an oblique direction, comparing the pulse-like signals obtained when at least one of said two edges extending perpendicularly to the web travel direction is scanned by two of the sensors disposed adjacent one another perpendicularly to the web travel direction.

* * * * *